(12) United States Patent
Hesselhaus

(10) Patent No.: US 6,793,267 B2
(45) Date of Patent: Sep. 21, 2004

(54) CONVERTIBLE WITH AT LEAST PARTIALLY FLEXIBLE TOP

(75) Inventor: Udo Hesselhaus, Ibbenbüren (DE)

(73) Assignee: Wilhelm Karmann GmbH, Osnabrück (DE)

(*) Notice: Subject to any disclaimer, the term of this patent is extended or adjusted under 35 U.S.C. 154(b) by 0 days.

(21) Appl. No.: 10/225,074

(22) Filed: Aug. 21, 2002

(65) Prior Publication Data

US 2003/0038501 A1 Feb. 27, 2003

(30) Foreign Application Priority Data

Aug. 22, 2001 (DE) .......................................... 101 40 234

(51) Int. Cl.⁷ ................................................ B60J 7/00
(52) U.S. Cl. ............................ 296/107.12; 296/107.07; 296/107.08
(58) Field of Search ....................... 296/107.07, 107.08, 296/107.09, 107.11, 107.12, 107.15; 135/907

(56) References Cited

U.S. PATENT DOCUMENTS

| | | | | |
|---|---|---|---|---|
| 5,052,747 A | * | 10/1991 | Kubota et al. | 296/107.09 |
| 5,267,770 A | * | 12/1993 | Orth et al. | 296/107.07 |
| 5,295,722 A | * | 3/1994 | Bonne et al. | 296/107.08 |
| 2002/0105205 A1 | * | 8/2002 | Willard | 296/107.07 |
| 2003/0057728 A1 | * | 3/2003 | Sims | 296/107.09 |

* cited by examiner

Primary Examiner—Lori L. Coletta
(74) Attorney, Agent, or Firm—Friedrich Kueffner

(57) ABSTRACT

A convertible has an at least partially flexible top stowable in the rear of the convertible. The top has a mechanical support and a flexible top part stretched across the mechanical support. The mechanical support is configured to shorten the flexible top part in a direction substantially parallel to a longitudinal direction of the convertible when opening the top.

12 Claims, 16 Drawing Sheets

CONVERTIBLE WITH AT LEAST PARTIALLY FLEXIBLE TOP

BACKGROUND OF THE INVENTION

1. Field of the Invention

The invention relates to a convertible having a top which can be stowed in the rearward vehicle area, wherein the top is at least partially flexible.

2. Description of the Related Art

It is known to configure convertibles with flexible tops or flexible top areas such that the flexible top areas comprise textile coverings which extend between lateral frame parts extending in the longitudinal direction of the vehicle. These coverings are supported from below by hoops extending transversely between the lateral frame parts. For opening such tops, the frame parts are pivoted open about horizontal pivot axes extending in the transverse direction of the vehicle, wherein the individual portions of the covering extending between the lateral frame parts are stacked atop one another. The tension within the flexible covering is released by releasing a top closure so that folding is possible. The transverse hoops, which usually also ensure an upwardly curved configuration of the top, often collide with one another during folding so that special geometries must be provided for their arrangement. Even when the hoops are placed such that they are positioned sequentially with sufficient spacing to one another upon folding, the thickness of the resulting package of parallel positioned top parts cannot be reduced at will because the covering extends across the hoops and between them and, as a result of the remaining tension, cannot be compressed by the hoop of the adjacent top part to just any desired amount. Moreover, in the stowed state the lateral frame parts, which are often curved outwardly in order to ensure a continuous top contour in the closed position of the top, also block one another. In the stowed state the outwardly curved portions then rest on one another. Also, the length of this package is determined by the length of the frame parts and increases with increasing length of the interior of the vehicle. More than three sequential portions generally cannot be realized because the package of the folded top would then have a thickness that is too great.

SUMMARY OF THE INVENTION

It is an object of the present invention to provide a convertible which provides a small package size of the folded (open) top.

In accordance with the present invention, this is achieved in that the flexible top part is stretched or tensioned across a mechanical support which enables a shortening of the flexible top part substantially parallel to the longitudinal extension of the vehicle when opening the flexible top part.

With the convertible according to the invention, by means of the shortening of the longitudinal extension of the flexible top part when opening the top, a reduction of the longitudinal extension in the stowed state is possible. At the same time, it is no longer necessary to fold parts of the top about horizontal pivot axes into a stacked arrangement. In this way, it is prevented that several hoops must be placed atop one another which causes the afore described limitation of the minimal thickness of the folded package of the top in the stowed state. Accordingly, in addition to shortening by means of the invention a thickness reduction of the stowed package is achieved also. In this way, the remaining trunk space is increased with regard to its length as well as its height.

The shortening can be simplified and realized by utilizing to the greatest possible extent components that are already present when for the purpose of effecting the shortening lateral frame parts are configured to be foldable relative to one another about vertical axes.

A configuration with a rigid rearward top part enables a simple shortening of the top because only that part must be folded that in the closed state forms a substantially horizontal surface. In this way, the shortening movement of the flexible top part can be limited to a substantially two-dimensional movement plane.

The entire flexible top part can advantageously be stowed under the rigid rearward top part so that the rigid top part limits the length of the package of the top in the stowed state and provides simultaneously a protective function. In particular, the rigid rearward top part in the stowed state can also point upwardly in order to prevent that it will project into the trunk space with its outward curvature.

DESCRIPTION OF THE PREFERRED EMBODIMENTS

Figure 1:
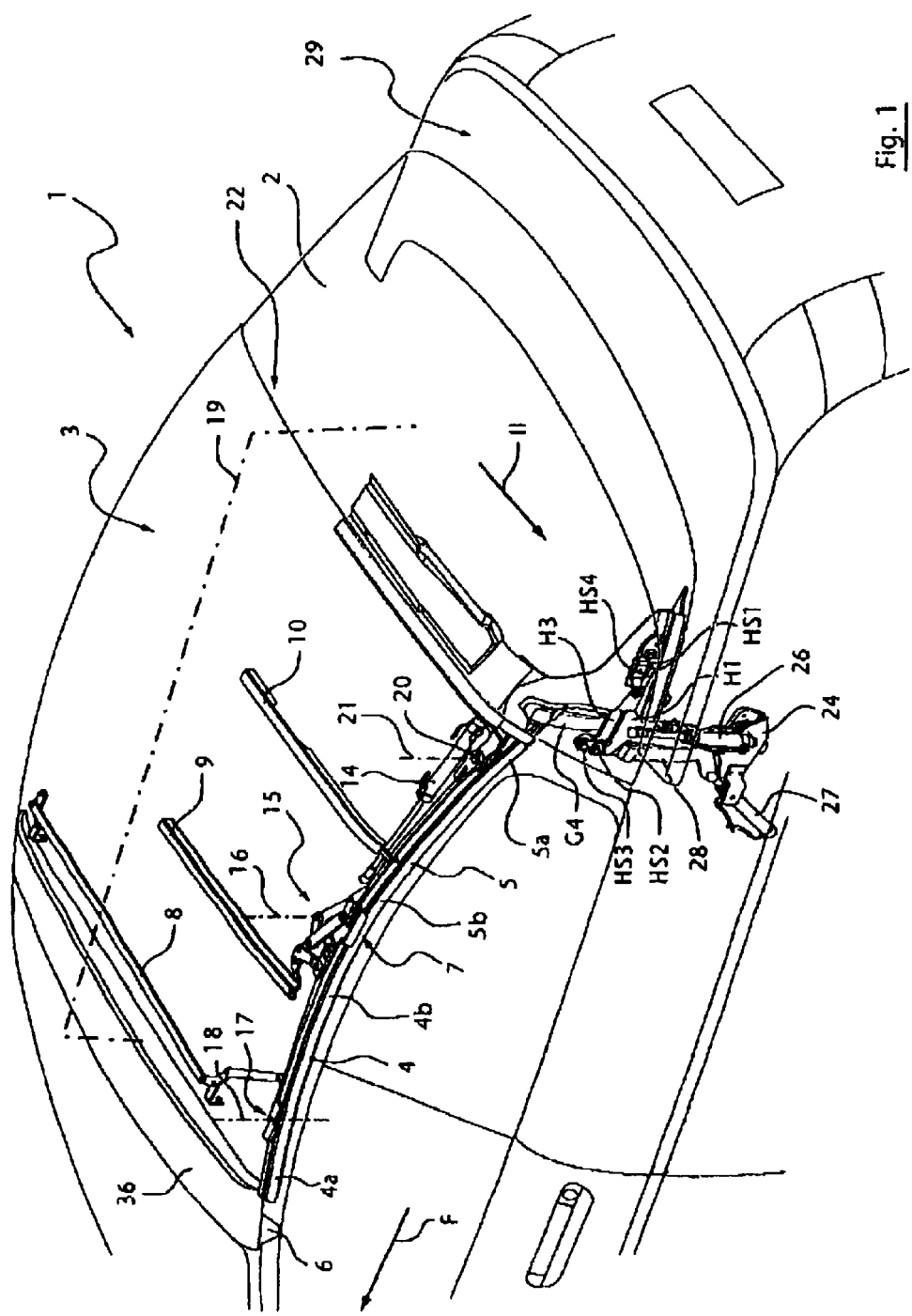
FIG. 1 is a perspective view from the rear at an angle onto a central portion of a convertible according to the invention with the top in the closed position.

The convertible 1 according to the illustrated embodiment comprises a top with a rigid rearward top part 2 and a flexible top part 3 adjoining the rigid top part 2 in the travel direction F.

The top part 3 comprises a mechanical support comprising lateral frame parts 4, 5 correlated with the two sides of the vehicle, respectively, which are sequentially aligned with one another in the closed state of the top. In this connection, the first frame part 4 extends from the windshield frame 6 or a stationary forward transverse end 36 of the top to a parting line 7 between the frame parts 4, 5. The rearward frame part 5 extends from the parting line 7 to the rearward top part 2. It is also possible to employ a different number of lateral frame parts. The frame parts 4, 5 on the two vehicle side are connected to one another by transverse hoops 9, 10, 11 of the mechanical support. The top covering 12 is stretched across these hoops 9, 10, 11. The rearward hoop 11 in the closed state is secured directly in front of the rearward top part 2 and forms a tensioning bar for the rearward end 13 of the covering 12. Moreover, a synchronizing means in the form of a forward synchronization linkage 8 is provided which extends transversely relative to the covering 12 like the hoops 9, 10, 11. In this way, a uniform movement of the two top sides parallel to the longitudinal direction of the vehicle can be achieved for shortening the top, as will be described in the following.

In the area of the rearward hoop 11, a drive member 14, in the illustrated embodiment a hydraulic cylinder, is arranged on each vehicle side, respectively. The drive member 14 extends from the hoop 11 to a joint 15 which is arranged in the area of the parting line 7 and can be pivoted open about at least one vertical axis 16. The drive member 14 is covered by the covering 12. Its forward end is displaced farther in the direction of a vertical longitudinal center plane of the vehicle then its rearward end. The joint 15 is connected to the lateral frame parts 4, 5 in the vicinity of the parting line 7. The forward frame part 4, over the course of its longitudinal extension, is divided in an area remote from the parting line 7 at the joint 17 into a forward section 4a, which is not pivotable relative to a vertical longitudinal plane of the vehicle, and a section 4b which can be pivoted relative to it about a vertical axis 18 of the joint 17 in the direction toward the vertical longitudinal center plane 19 of the vehicle. The rearward frame part 5, over the course of its longitudinal extension, is also divided in an area remote from the parting line 7 at the joint 20 into a section 5a, which is not pivotable relative to a vertical longitudinal plane of the vehicle, and into a section 5b, which is pivotable relative to it about a vertical axis 21 of the joint 20 in the direction toward the vertical longitudinal center plane 19 of the vehicle.

The rearward top part 2 and the flexible top part 3 form in each phase of their movement a continuous exterior top surface which is not interrupted—for example, in the area of the transition between the top part 2 to the top part 3—by an open seam. In this connection, the textile covering 12 can either be connected to the fixed top part 2 or can cover it partially.

A configuration is shown in which the rearward top part 2 overall is formed as a glass dome or plastic dome and is connected with its leading edge 22 with the covering 12 without being covered by it. In order to prevent heating of the interior, the rearward top part which is dome-shaped can be provided outside of its central transparent area with a dark light absorbing and/or heat absorbing coating.

The rearward top part 2 is connected by a linkage 23 to a main bearing 24 on each vehicle side about which the rearward top part 2 can be pivoted into an open position about a horizontal axis extending in the transverse direction of the vehicle. The linkage 23 comprises two drive members 25, 26. The drive member 25 is connected at the side of the piston rod by a lever Gh with a parallelogram linkage G. The linkage G comprises four parts G1, G2, G3 and G4 which are connected to one another at the pivot joints GS1, GS2, GS3, GS4. The pivot axes of these joints extend horizontally and in the transverse direction of the vehicle. The four-bar mechanism G engages the rearward end of the forward top part 3 by means of the joints GS3 and GS4 so that the actuation of the four-bar mechanism G can effect a relative movement between the top parts 2 and 3.

The piston rod side of the drive member 26 engages a first bar H1 of the second parallelogram linkage H. The bar H1 extends parallel to the bar H3. Between them, the bars H2 and H4 are positioned which are connected by means of the joints HS1 and HS2 to the bar H1 and by means of the joints HS3 and HS4 to the bar H3. In the shown embodiment, the drive members 25, 26 are arranged such that an almost vertical lifting movement of the top part 2 can be realized with their assistance. The relative movement of the forward top part 3 can be realized in a stationary position of the rearward top part 2.

Moreover, a third drive member 27 is provided which engages a main lever 28 and, in this way, can actuate a pivot movement with a large pivot angle about the main bearing 24.

In the closed state of the top, the rearward top part 2 with its rearward edge 35 rests on a lid part 29. This lid part 29 has a double function: covering the storage box of the top as well as covering the trunk space. Accordingly, the lid part 29 can be opened in a first direction for releasing the through opening for the top and in a second direction for releasing a loading opening for the trunk space. For this purpose, the lid part is of a two-part configuration, wherein the forward part 30 adjoins the rearward part 32 at a transverse seam 31. The leading end of the forward part 30 in the travel direction F is moveably secured in a longitudinal guide and is pivotably connected with the rearward part 32 in the area of the transverse seam 31. The rearward part 32 is connected with its reward edge pivotably on the car body 33. The pivot movement of the rearward part 32 of the lid part 29 can be effected by at least one drive member positioned in the area of the rearward connection of the rearward part 32.

Figure 2:
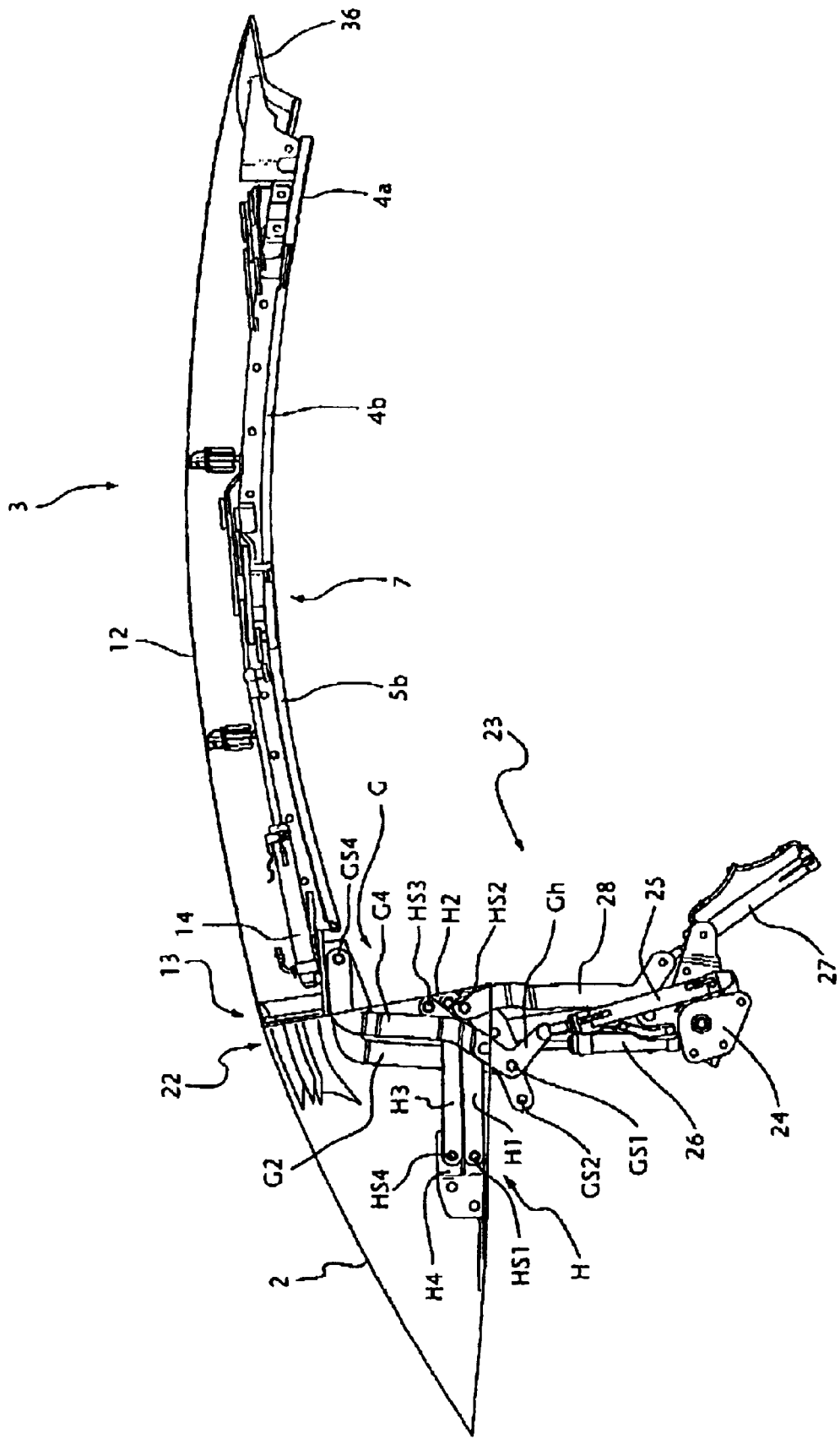
FIG. 2 is a side view of the closed top viewed in a direction of arrow II in FIG. 1.
Figure 15:
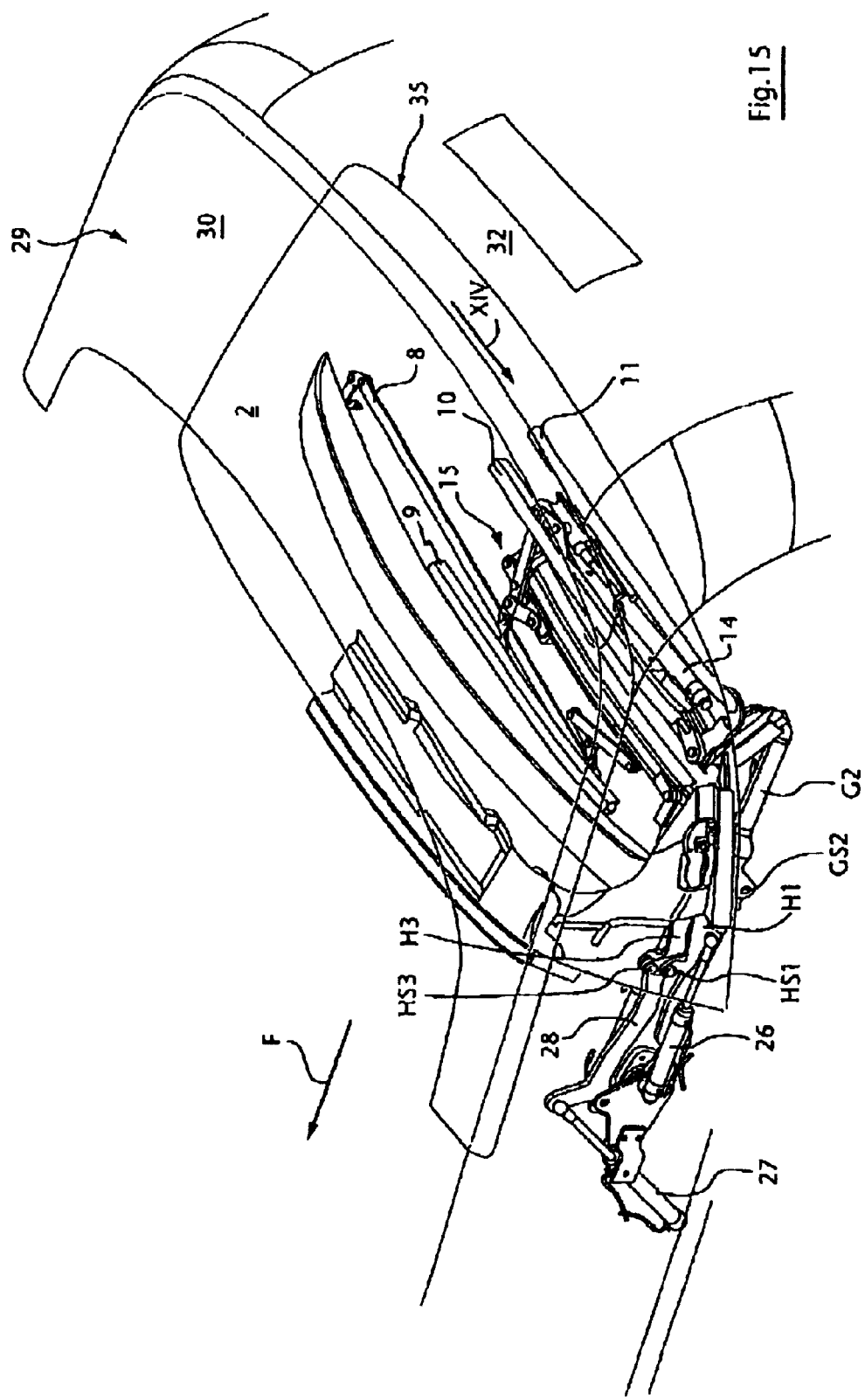
FIG. 15 is a view similar to FIG. 13 with the top opened completely.
Figure 16:
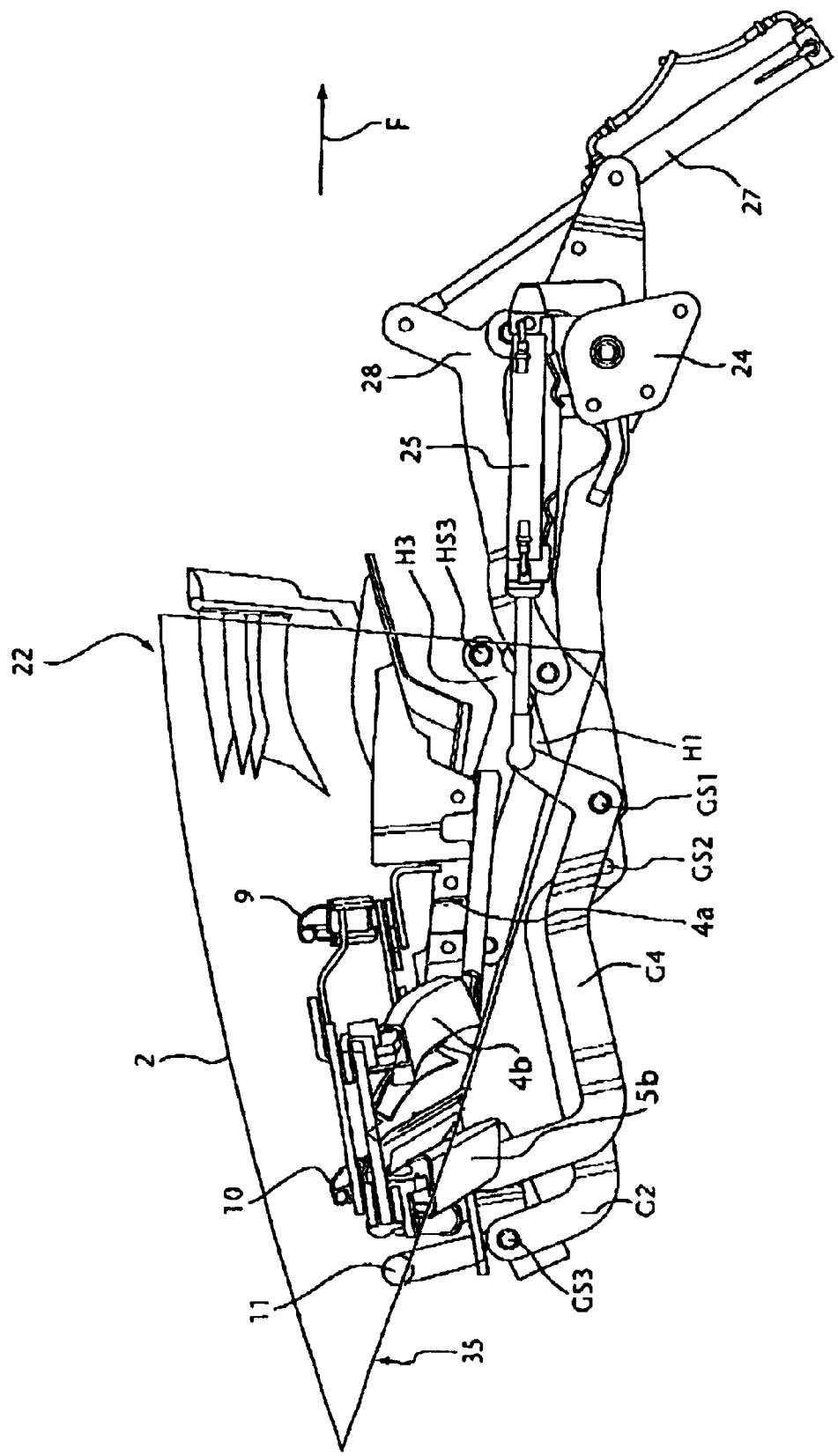
FIG. 16 is a side view onto the completely open top, viewed in the direction of arrow XVI of FIG. 15.

In order to transfer the top from its closed position according to FIGS. 1 and 2 into the open position according to FIGS. 15 and 16, the following sequence of steps occurs.

Figure 3:
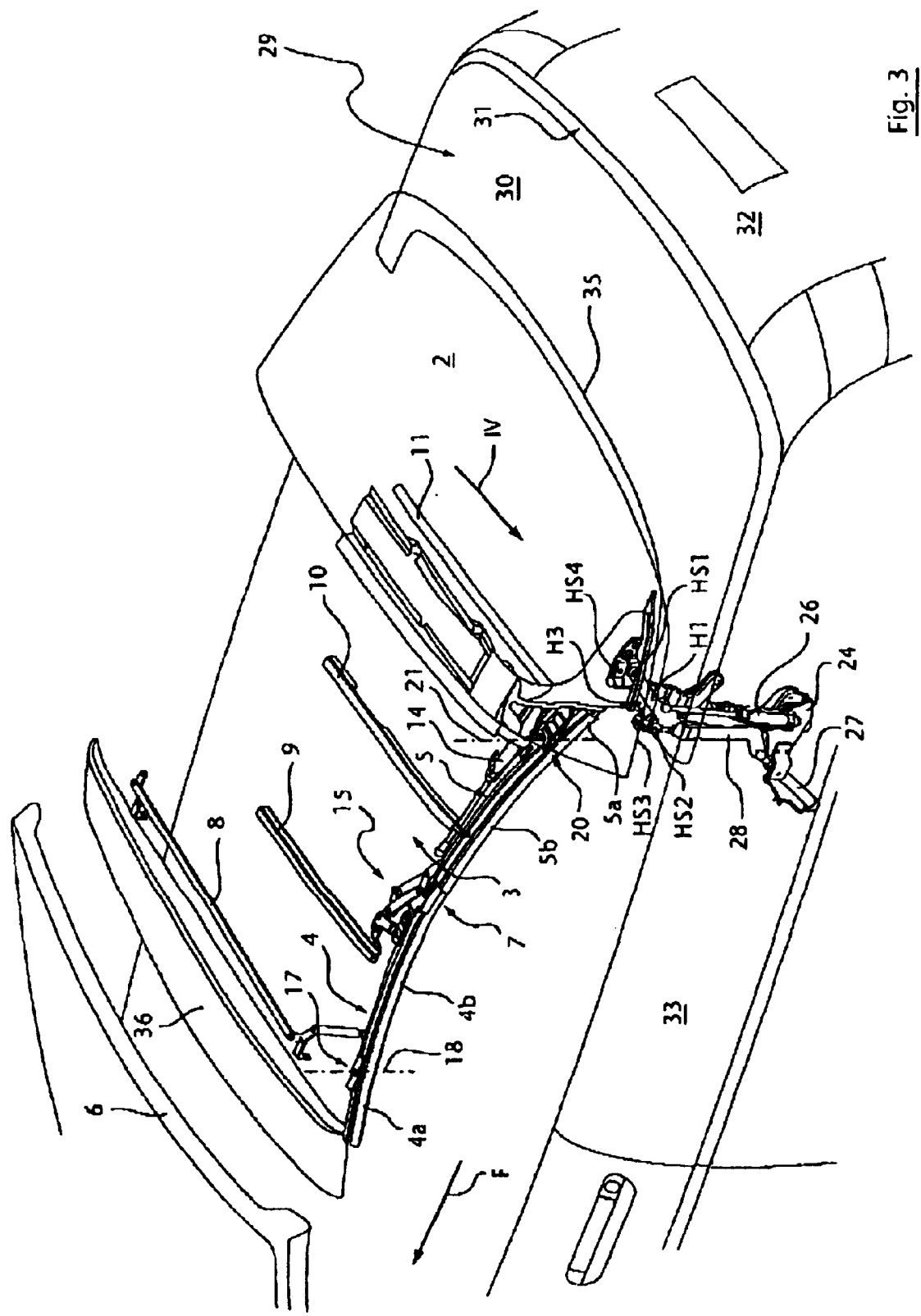
FIG. 3 is a view similar to FIG. 2 during an initial phase of opening of the top.
Figure 4:
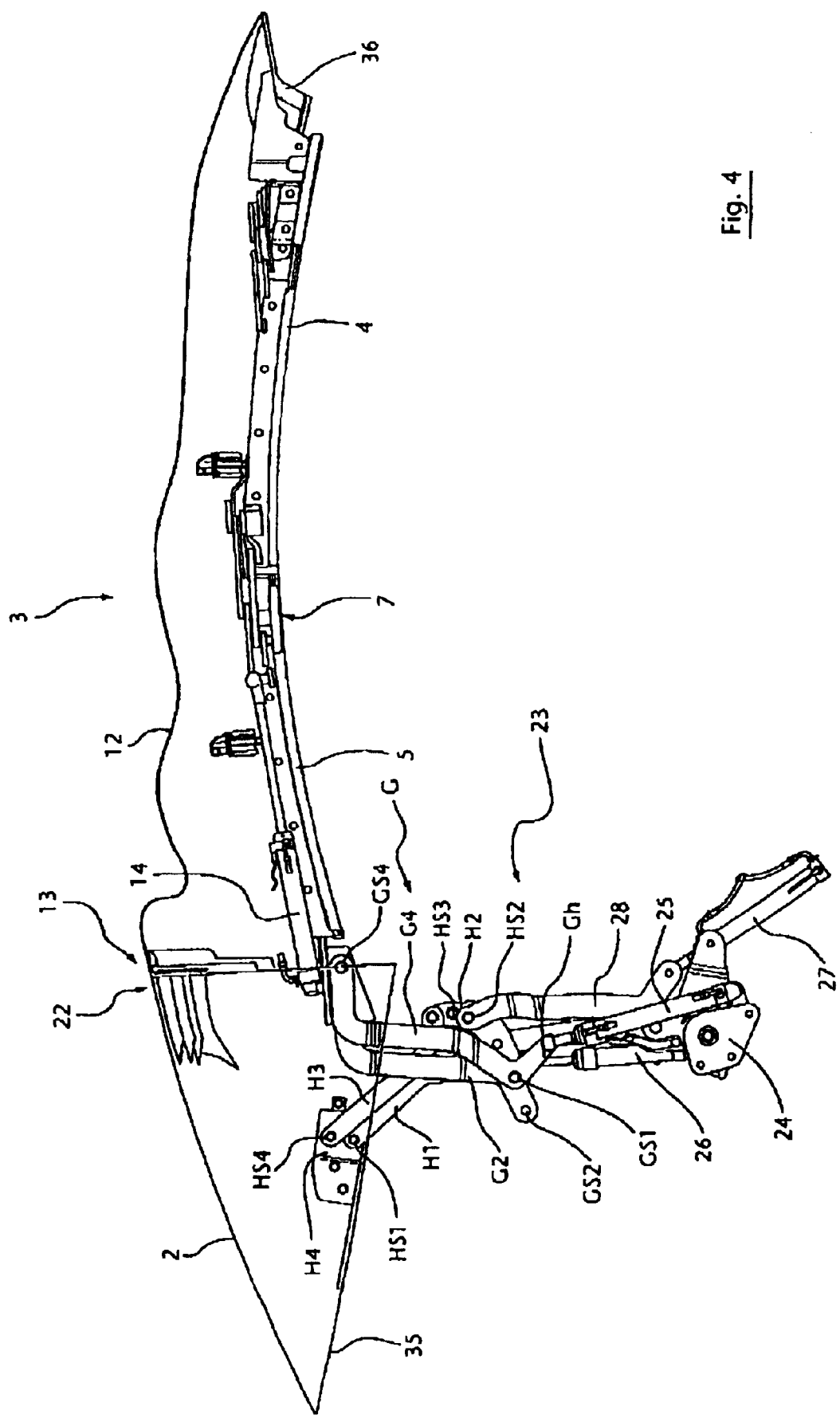
FIG. 4 is a side view onto the top being opened viewed in a direction of arrow IV of FIG. 3.

In a first step or movement phase (FIGS. 3 and 4), the rearward top part 2 is lifted. This lifting action can be a purely vertical lifting movement. For this purpose, the rearward drive member 26 is extended. Because the joints HS2 and HS3 are initially secured by the stationary main lever 28 in a position fixed relative to the car body, the drive member 26 will open the four-bar mechanism H such that the bars H1 and H3 are pivoted open about the aforementioned joints HS2 and HS3 so that the rearward joints HS1 and HS4, which are secured on the rearward top part 2, are moved forwardly and upwardly. The rearward top part 2 is thus lifted by a few centimeters away from the lid part 29. Because of the parallelogram linkage, the lifting action is a combination movement comprised of a lifting movement and a pivoting movement. The top part 2 is pushed to a minimal extent across the flexible top part 3 so that the covering 12 is relaxed.

In this position of the rearward top part 2, the lid part 29 can be opened. For this purpose, its rearward part 32 is pivoted open by means of the drive member(s)—not illustrated—relative to the car body 33. As a result of a coupling of the part 32 with a forward part 30 of the lid part 29, the lid part 29 is entrained counter to the travel direction F. The forward end of the forward part 30 is secured in the longitudinal guide. The pulling movement acting on the forward part 31 thus causes at the same time a lifting of its forward edge. Its rearward edge is lifted substantially more pronounced by the pivoting movement of the rearward part 32 and, at the same time, is pulled to the rear of the convertible away from its position underneath the rearward top part 2.

Correspondingly, the rearward edge of the rearward top part 2 is slightly moved to the rear and upward in this movement phase. As a whole, for enabling the opening of the lid part, the rearward top part 2 must be lifted only by a minimal amount. The total movement is thus accelerated.

Figure 5:
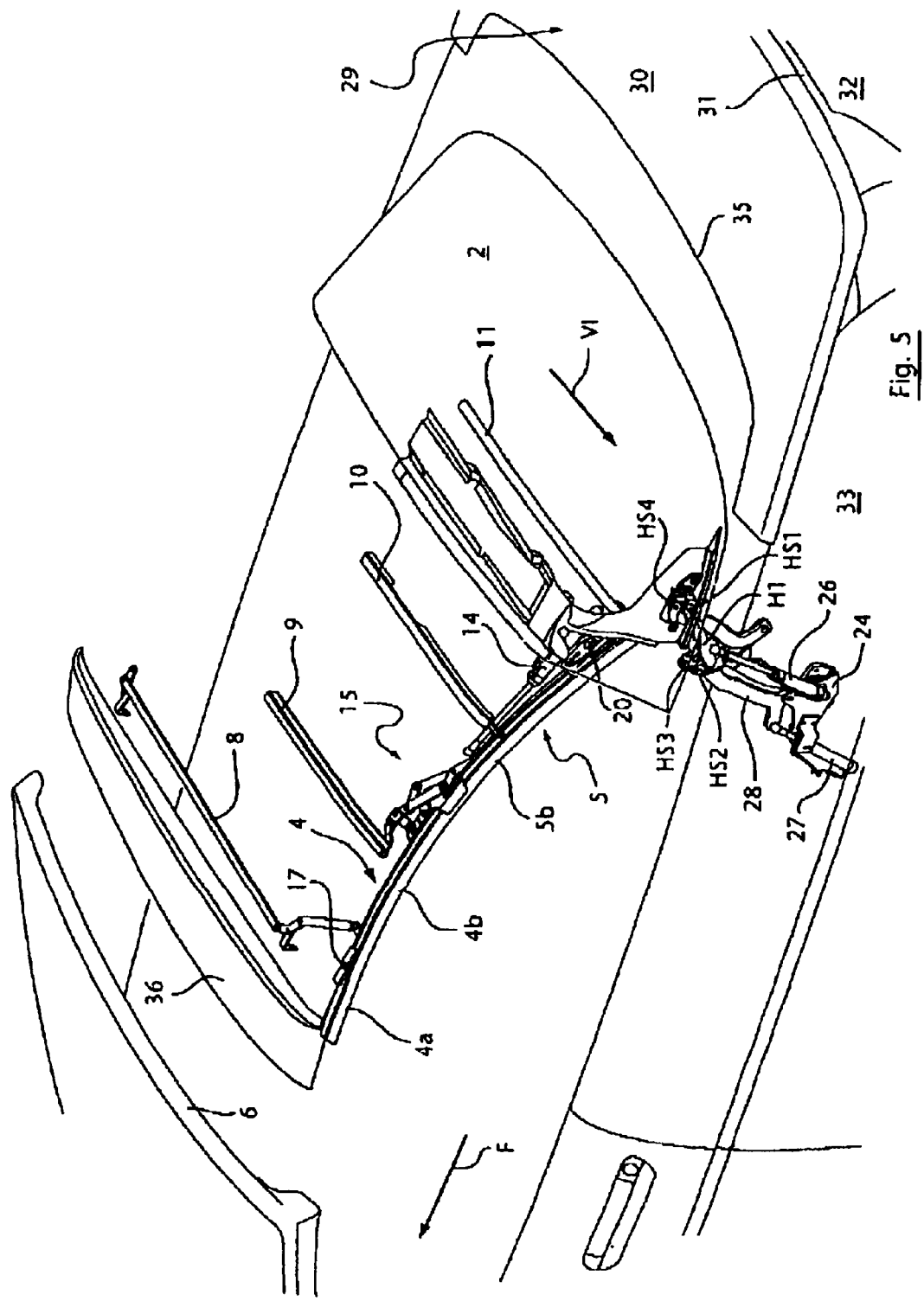
FIG. 5 is a view similar to FIG. 3 with the opening action of the top having progressed farther.
Figure 6:
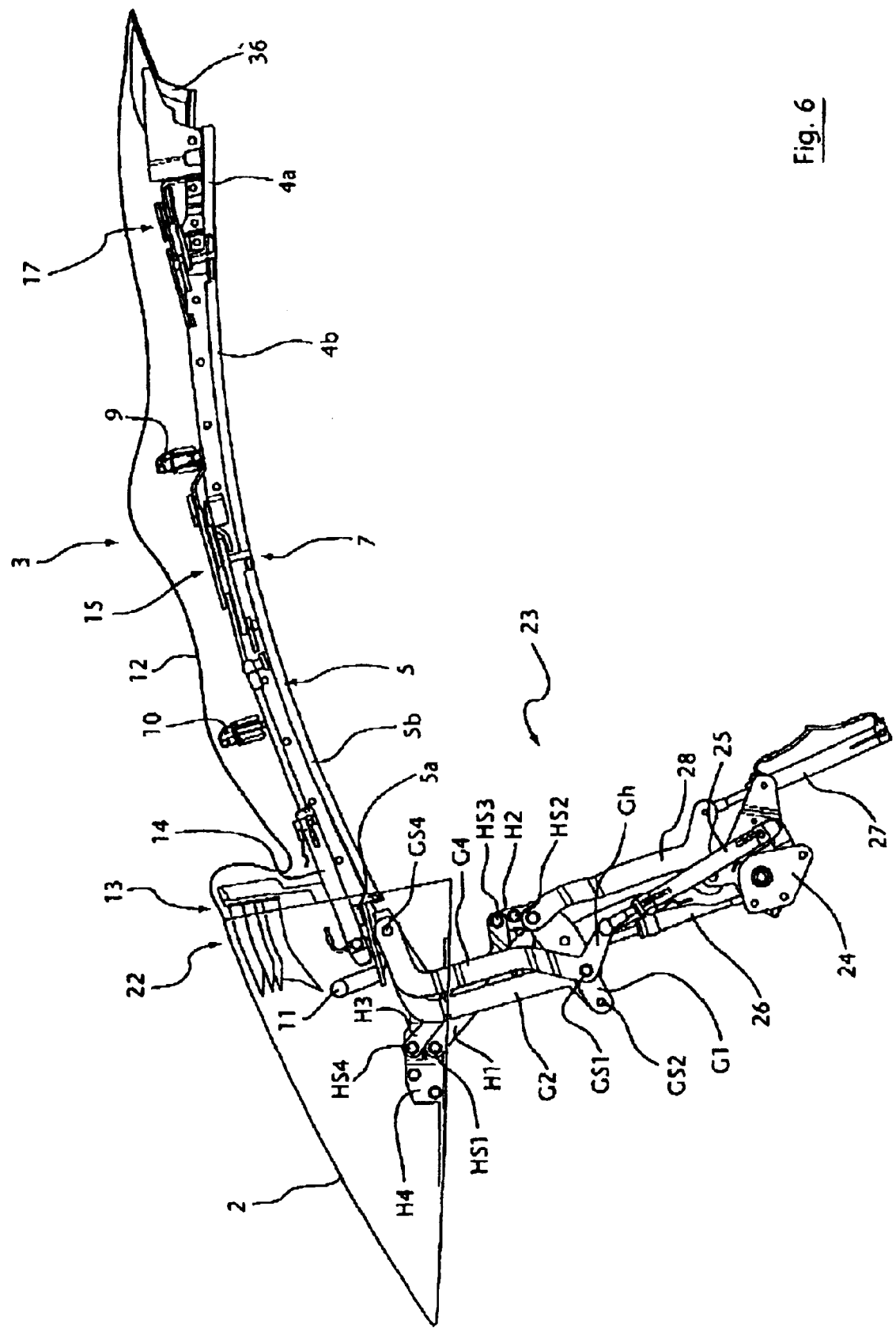
FIG. 6 is a side view onto the top with the opening action of the top having progressed farther, viewed in the direction of arrow VI of FIG. 5.
Figure 7:
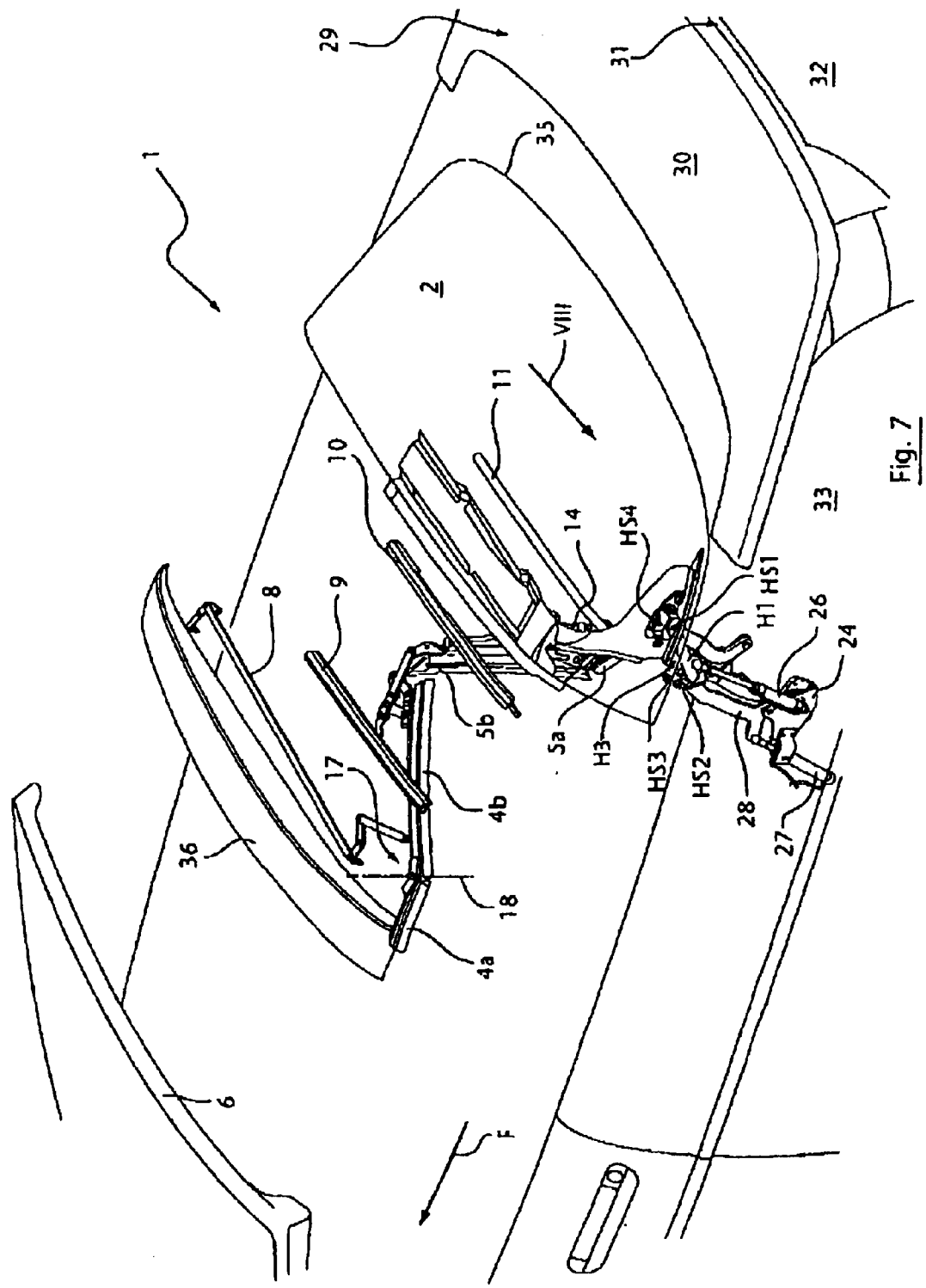
FIG. 7 is a view similar to FIG. 5 with the opening action of the top having progressed farther.
Figure 8:
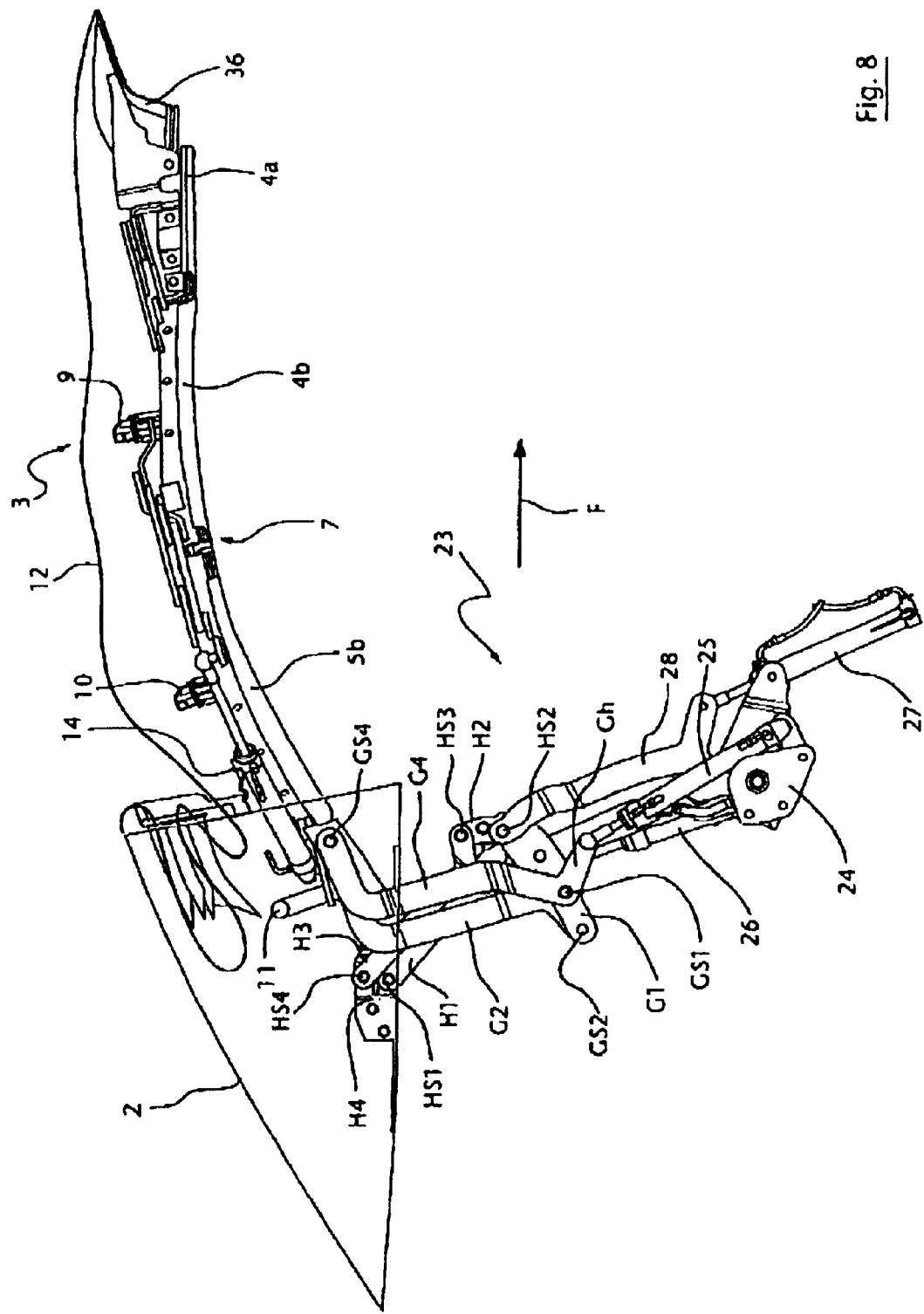
FIG. 8 is a side view onto the top which has been opened father, viewed in the direction of arrow VII in FIG. 7.
Figure 9:
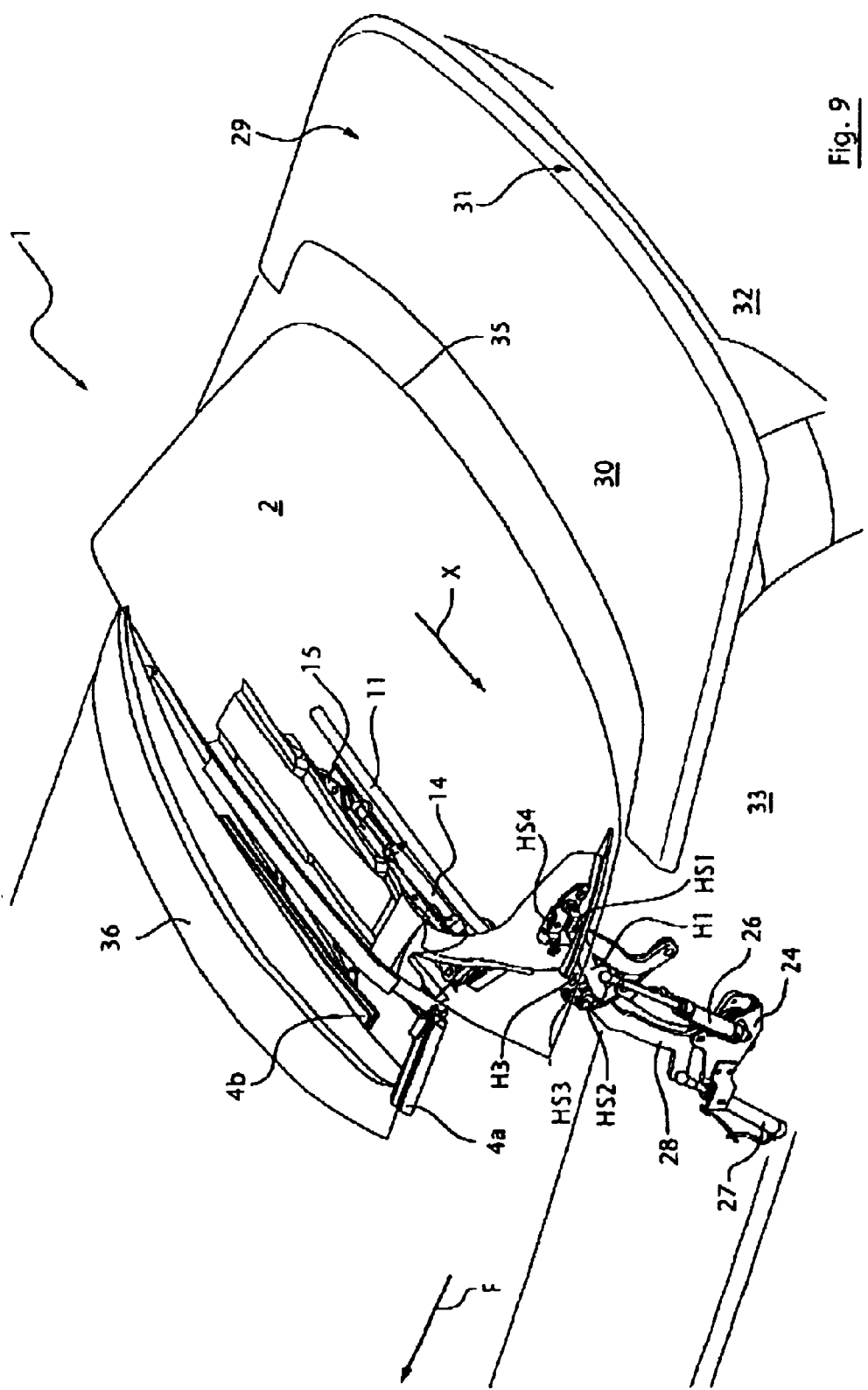
FIG. 9 is a view similar to FIG. 7 with the top opened father.
Figure 10:
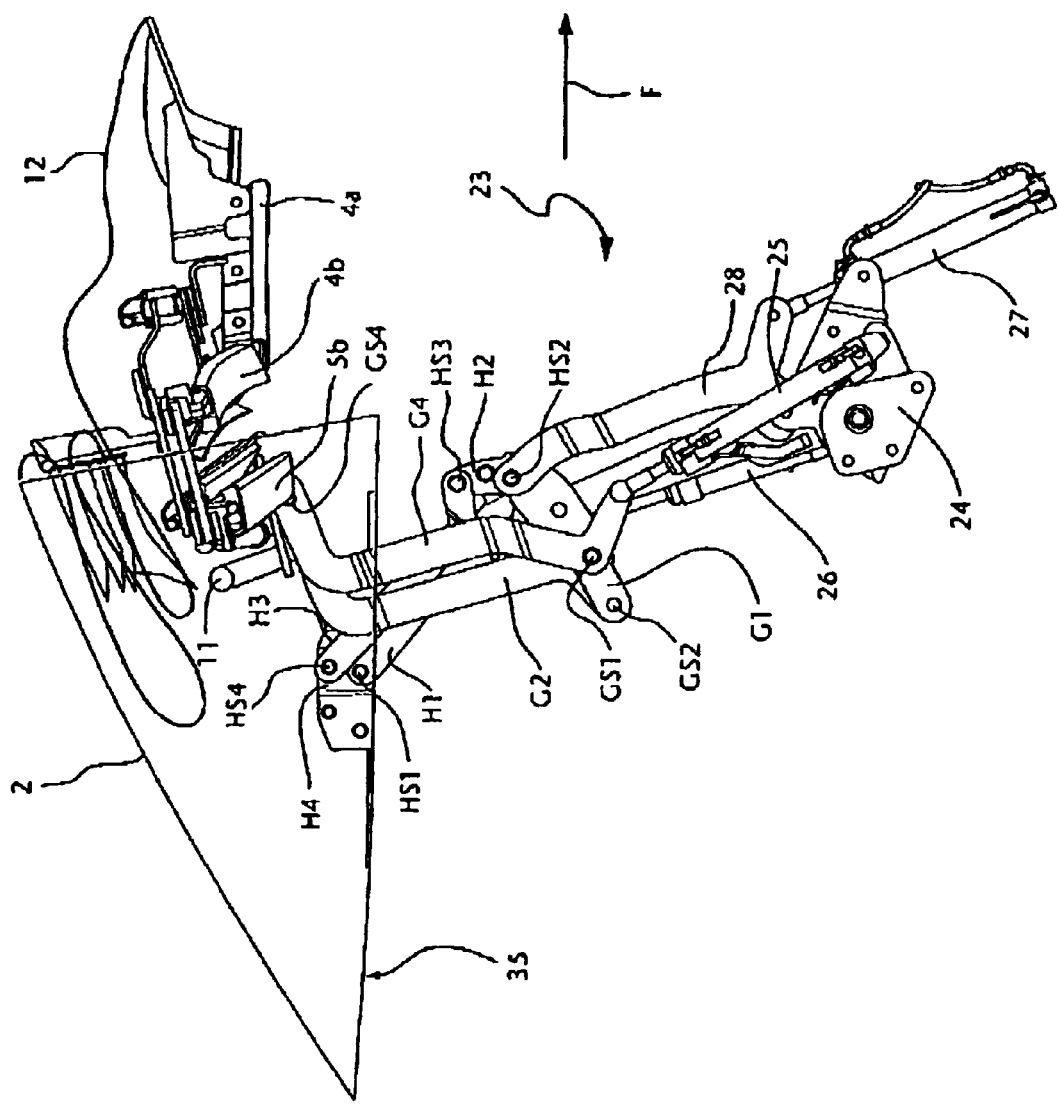
FIG. 10 is a side view onto the top which has been opened father, viewed in the direction of arrow X in FIG. 9.

For opening the top farther, the top is pivoted first by actuation of the drive member 27 by means of the main lever 28 by a certain amount to the rear (FIGS. 5 and 6) so that the head space for the drive and passenger(s) is increased. At the same time, the entire flexible top part 3 in the not yet shortened state is moved by an initial movement stroke rearwardly underneath the rearward top part 2 by actuating the drive member 25. The covering 12 has an additional length ("overmeasure" or "reserve") to allow this movement relative to the rigid top part 2.

Starting from this position, the folding movement of the flexible top part 3 (FIGS. 7 to 10) is carried out. In this connection, the drive members 25, 26, and 27 can remain in an unchanged position. The substantially horizontally positioned drive member 14 is retracted so that the joint 15 is opened which, in the illustrated embodiment, is a horizontally positioned joint pivotable about a vertical axis and configured like a seven-bar mechanism of a slidable lattice grate design. It is connected with the forward lateral frame part 4 as well as with the rearward lateral frame part 5 in the vicinity of the parting line 7, respectively, and exerts torque on the parts 4, 5. The sections 4b and 5b are thus pulled inwardly in the direction of the vertical longitudinal center plane 19 of the vehicle. The section 4b pivots inwardly relative to the forward section 4a, which maintains its longitudinal orientation, about the vertical axis 18 of the joint 17. The section 5b of the rearward frame part 5 pivots inwardly relative to its rearward section 5a, which maintains its longitudinal orientation, about the vertical axis 21 of the joint 20.

The shortening of the flexible top part 3 causes the hoops 10, 11 to become detached from the covering 12 so that the covering 12 is movable relative to the parts 10, 11 supporting it from below. It is possible to employ pull straps or similar means—not illustrated—in order to ensure automatic folding of the covering 12 so that it reaches the folded structure illustrated in FIGS. 10 and 12 and during shortening of the flexible cover part 3 will fold in a defined way without causing sharp kinks.

Figure 11:
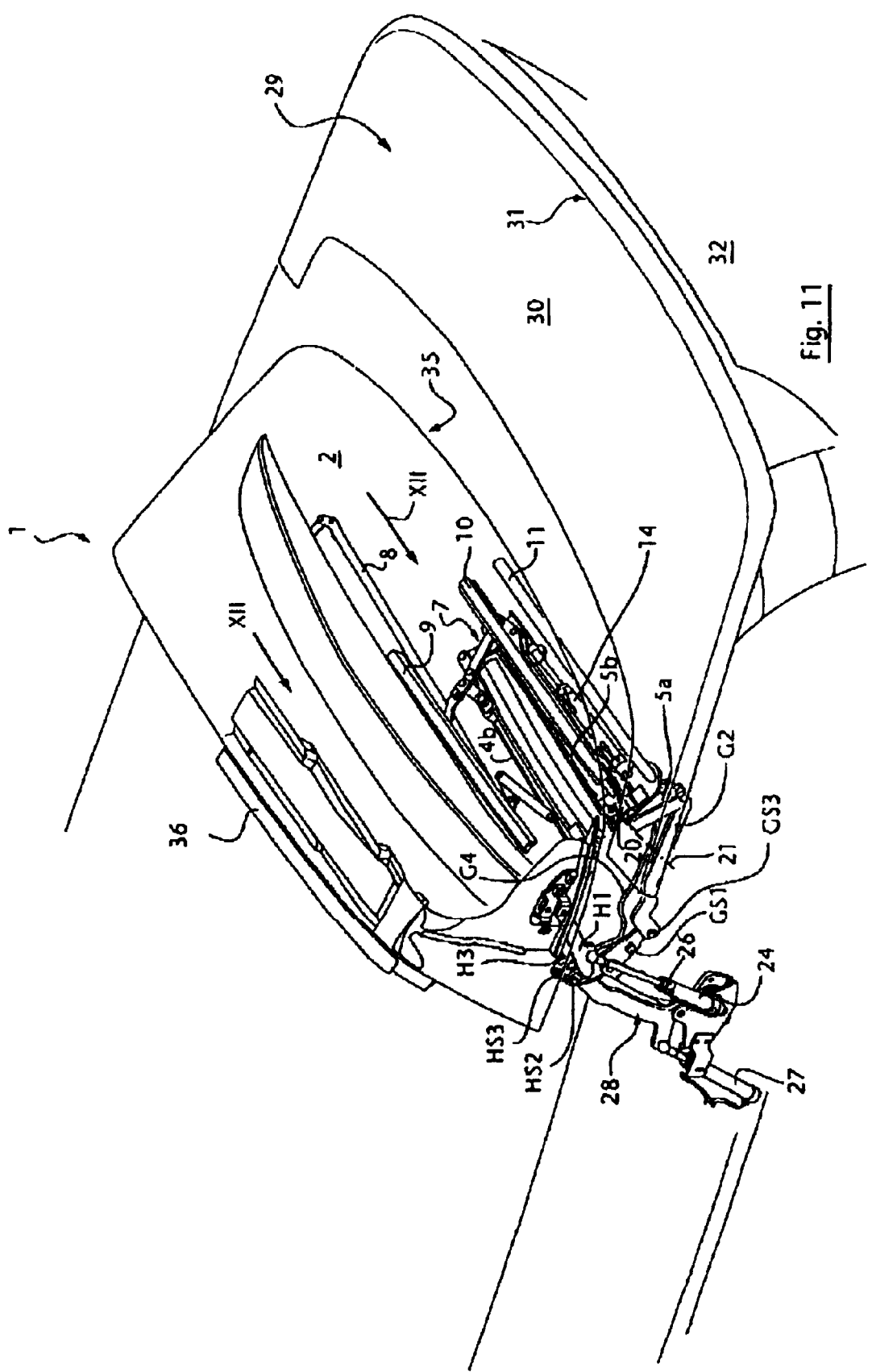
FIG. 11 is a view similar to FIG. 9 with the top opened father.
Figure 12:
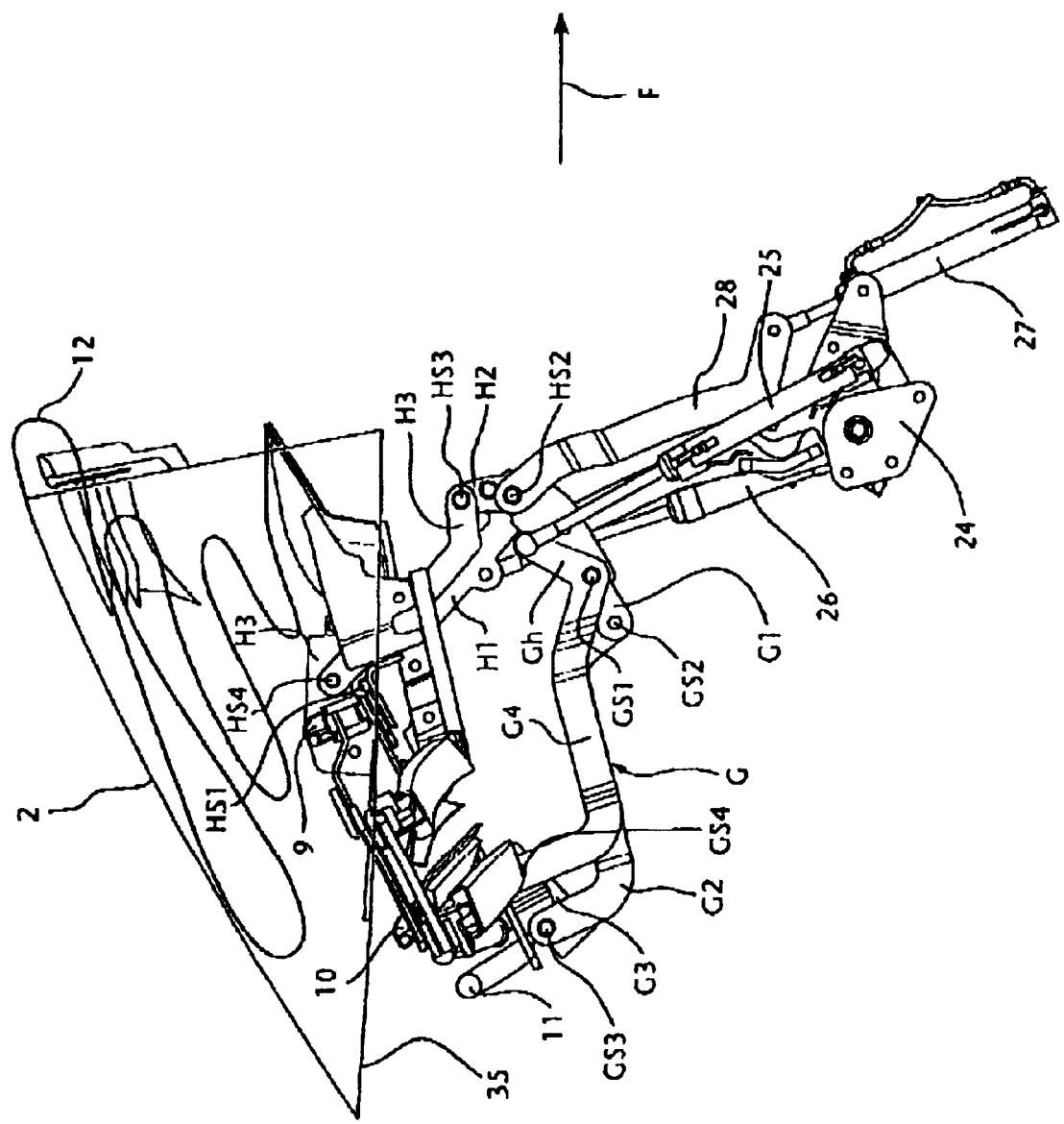
FIG. 12 is a side view onto the top which has been opened father, viewed in the direction of arrow XII of FIG. 11.
Figure 13:
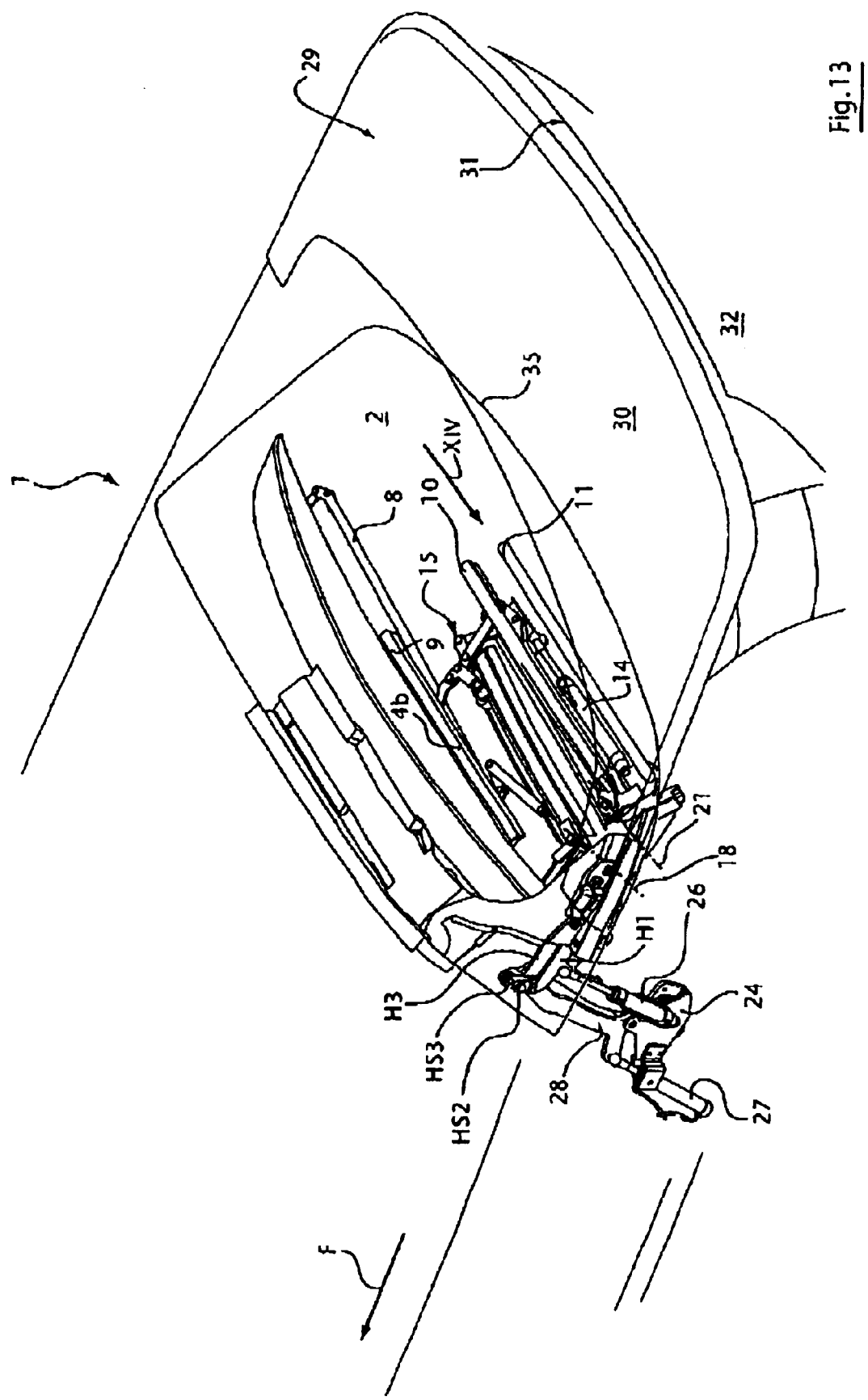
FIG. 13 is a view similar to FIG. 11 with the top opened farther.
Figure 14:
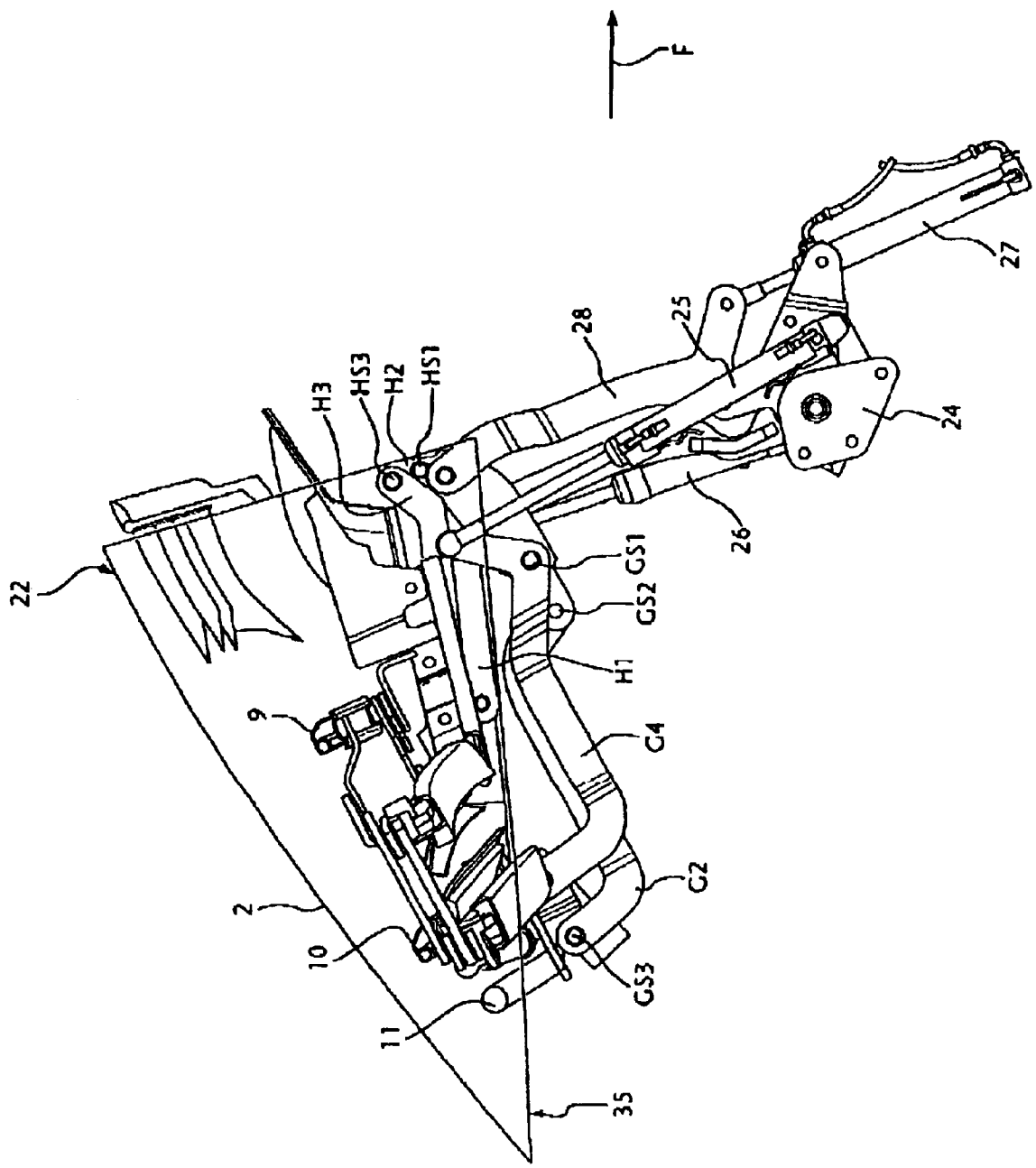
FIG. 14 is a side view onto the top which has been opened farther, viewed in the direction of arrow XIV of FIG. 13.

The sections 4b, 5b are pivoted by the drive member 14 to such an extent about the joints 17 or 20 that they extend substantially completely in the transverse direction of the vehicle at the end of the shortening action of the top (FIGS. 11 and 12). The parting line 7 is then positioned near the vertical longitudinal center plane 19 of the vehicle. The drive member 14 has also been pivoted into a position oriented transverse to the travel direction F. During shortening of the flexible top part 3, the rearward end of the flexible top part 3 is pulled to the rear at the same time by opening the four-bar mechanism G by means of the drive member 25, which engages the lever Gh and, in this way, moves the levers G2 and G4 about the joints GS1 and GS2 into a substantially horizontal position; in this way, the rearward hoop 11 moves approximately into the area of the rearward edge 35 of the rigid rearward top part 2. By detaching the covering 12, its rearward end can stay attached to the forward edge of the rearward top part 2 without being tensioned (FIG. 12).

As illustrated in FIG. 12, the longitudinal extension of the package formed in this way is extremely small and is substantially determined by the longitudinal dimension of the rigid rearward top part 2. The individual areas of the covering can be positioned tightly atop one another without the hoops or like elements limiting the minimum height of the resulting package. By lowering the rigid top part 2 in this phase of movement the height of the top which is to be stowed subsequently is reduced and a flat package of minimal height results.

The thus formed package, which is limited at the top side by the rigid top part 2, is pivoted rearwardly by extension of the drive member 27 and the resulting opening pivot movement of the main lever 28 into an approximately horizontal position (FIGS. 13 to 16) and in this way is stowed underneath the window sill line of the car body such that even in the closed position the rigid top part limits the stowed top in the upper direction. At the same time, the drive member 25, which acts directly onto the multi-bar mechanism, is retracted somewhat.

In this way, a very short package that at the same time is minimized with regard to height results so that the stowed top requires only minimal space in the trunk and therefore limits the trunk space only minimally.

It is understood that the individual movement phases are carried out sequentially without interruptions and can also overlap so that a particularly quick movement of the top results.

While specific embodiments of the invention have been shown and described in detail to illustrate the inventive principles, it will be understood that the invention may be embodied otherwise without departing from such principles.

What is claimed is:

1. A convertible comprising:
   an at least partially flexible top stowable in the rear of the convertible, the top being movable as a whole and free of lateral longitudinal guide means above side panes of the convertible;
   the top comprising a mechanical support and a flexible top part stretched across the mechanical supports;
   wherein the mechanical support is configured to shorten the flexible top part in a direction substantially parallel to a longitudinal direction of the convertible when opening the top, and wherein the mechanical support has synchronizing means for a uniform shortening of the flexible top part in the direction parallel to the longitudinal direction of the vehicle.

2. A convertible comprising:
   an at least partially flexible too stowable in the rear of the convertible;
   the top comprising a mechanical support and a flexible top part stretched across the mechanical support;
   wherein the mechanical support is configured to shorten the flexible top part in a direction substantially parallel to a longitudinal direction of the convertible when opening the top. wherein the mechanical support comprises areas pivotable about vertical axes for moving a forward end of the flexible top part parallel toward the rear of the convertible.

3. The convertible according to claim 2, wherein the mechanical support comprises lateral frame parts and wherein the flexible top part, in the closed position of the top, is tensioned across the lateral frame parts, wherein at least one of the lateral frame parts is pivotable about the vertical pivot axes when opening the top.

4. The convertible according to claim 3, wherein each longitudinal side of the convertible has at least two of the lateral frame parts arranged thereat, wherein the at least two lateral frame parts on each longitudinal side are aligned with one another in the closed position of the top.

5. The convertible according to claim 4, wherein the at least two lateral frame parts on each longitudinal side have a parting line and are pivotable about one of the vertical pivot axes at the parting line, respectively.

6. A convertible comprising:

an at least partially flexible top stowable in the rear of the convertible;

the top comprising a mechanical support and a flexible top part stretched across the mechanical support;

wherein the mechanical support is configured to shorten the flexible top part in a direction substantially parallel to a longitudinal direction of the convertible when opening the top, wherein the flexible top part comprises a covering having pulling means for effecting a predetermined folding of the flexible top part when being shortened during opening of the top, wherein the top comprises a rigid top part comprising a rear window of the convertible, wherein the rigid top part is arranged at the rear of the convertible, and wherein the flexible top part is stowed underneath the rigid top part when the top is in an open position.

7. The convertible according to claim 6, further comprising a car body, wherein the rigid top part is liftable relative to the car body of the convertible for opening the top.

8. The convertible according to claim 7, wherein, in a first movement phase of opening the top, the flexible top part is moved rearwardly by an initial movement stroke into a position underneath the rigid top part while the lateral frame parts remain sequentially aligned, wherein the covering of the flexible top part has an additional length to allow the initial movement stroke.

9. The convertible according to claim 8, wherein, in a second movement phase of opening the top, shortening of the flexible top part by pivoting of the lateral frame parts is carried out.

10. The convertible according to claim 8, wherein, in a last movement phase of opening the top, the rigid top part and the flexible top part, substantially stowed completely underneath the rigid top part, are moved into a position below a window sill line of the car body.

11. The convertible according to claim 10, wherein, in a stowed position of the top, the rigid top part with the rear window faces upwardly.

12. The convertible according to claim 11, wherein the rigid top part is formed completely as a glass dome.

* * * * *